A. M. WINTERBOTTOM.
HAT PIN GUARD.
APPLICATION FILED FEB. 2, 1918.

1,277,806.

Patented Sept. 3, 1918.

Witnesses.
F. C. Gibson.

Inventor
A. M. Winterbottom.

By Victor J. Evans
Attorney the sections 11 and 12 are formed upon one side of the pivot 13 with outwardly divergent walls 15, which are connected together at each side by any suitable connection which will permit of their movement away from and toward one another. This connection may be in the form of a flexible connection 16 as shown, or side flanges may be provided upon one of the sections to overlap the other section. A similar connection 17 is provided at the end of the walls 15. The opposed faces at the opposite side of the pivot pin 13 are hollowed out to form a chamber 18, the side walls of which normally contact as shown at 19 in Fig. 1. This chamber forms the bill of the bird and its extremity is provided with an entrance opening 20. The chamber 18 is normally held in closed position through the influence of a coil spring 21, which surrounds the pivot pin 13 and has its ends contacting with the divergent faces 15 as shown at 22.

UNITED STATES PATENT OFFICE.

AGNES MAY WINTERBOTTOM, OF NEW BEDFORD, MASSACHUSETTS.

HAT-PIN GUARD.

1,277,806.  Specification of Letters Patent.  Patented Sept. 3, 1918.

Application filed February 2, 1918.  Serial No. 215,113.

*To all whom it may concern:*

Be it known that I, AGNES M. WINTERBOTTOM, a citizen of the United States, residing at New Bedford, in the county of Bristol and State of Massachusetts, have invented new and useful Improvements in Hat-Pin Guards, of which the following is a specification.

This invention relates to protectors for hat pins and aims to provide a simple, neat and attractive article which may be quickly secured to or removed from the point of a hat pin to cover the same and prevent the accidental removal of the pin from the hat.

With this end the invention includes a pair of complemental sections preferably shaped in the form of the head of a bird, the said sections being pivotally connected together and having their opposed faces divergently arranged upon one side of a pivot, the faces upon the opposite side of the pivot forming a normally closed chamber, which is yieldingly maintained in such closed condition through the medium of a coil spring which surrounds the pivot of the sections, one wall of the chamber carrying a transversely disposed pin, which is adapted to engage an opening provided in the end of a hat pin.

In the drawings:—

Figure 1:
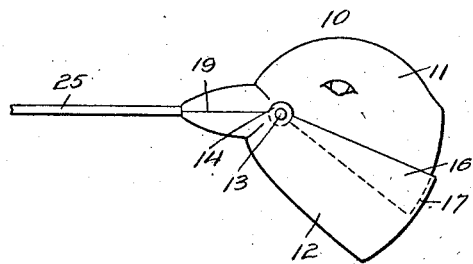
Figure 1 is a side elevation illustrating the improved protector secured upon the end of a hat pin.
Figure 2:
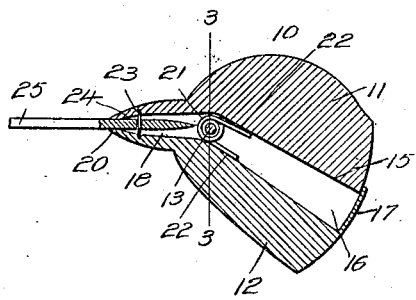
Fig. 2 is a longitudinal sectional view of the same.
Figure 3:
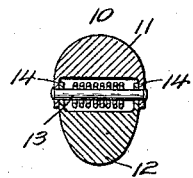
Fig. 3 is a section on line 3—3 of Fig. 2.
Figure 4:
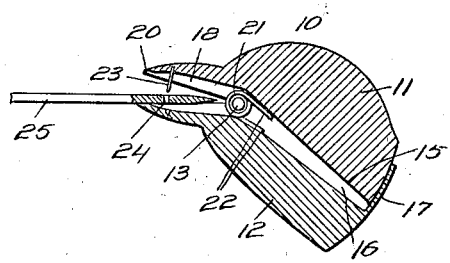
Fig. 4 is a section similar to Fig. 2, the protector being shown open or in position to receive the pin.

Referring to the drawings in detail, the numeral 10 designates the protector, which includes sections 11 and 12, which are joined together at a point intermediate their ends by a pivot pin 13. The pin 13 is adapted to pass through ears 14 provided upon each side of each of the sections 11 and 12, the ends of the pivot pin being riveted to hold the same in position. The opposed faces of the sections 11 and 12 are formed upon one side of the pivot 13 with outwardly divergent walls 15, which are connected together at each side by any suitable connection which will permit of their movement away from and toward one another. This connection may be in the form of a flexible connection 16 as shown, or side flanges may be provided upon one of the sections to overlap the other section. A similar connection 17 is provided at the end of the walls 15. The opposed faces at the opposite side of the pivot pin 13 are hollowed out to form a chamber 18, the side walls of which normally contact as shown at 19 in Fig. 1. This chamber forms the bill of the bird and its extremity is provided with an entrance opening 20. The chamber 18 is normally held in closed position through the influence of a coil spring 21, which surrounds the pivot pin 13 and has its ends contacting with the divergent faces 15 as shown at 22.

Secured to one of the walls of the chamber 18 and extending transversely across the latter is a pin 23, the free end of the pin contacting the adjacent wall of the chamber when the latter is closed. This pin is adapted for passage through an opening 24 provided in the end of the hat pin 25.

When it is desired to adjust or remove the protector, the bill of the bird within which the chamber 18 is formed is opened by pressing upon the head so as to move the sections 11 and 12 upon the pivot 13. The end of the pin 25 may then be readily adjusted upon the pin 23 or removed therefrom as the case may be. While the protector is shown and described in the form of the head of a bird, it may be made in various other shapes or configurations, the one illustrated merely serving to show one of these various forms.

Having described the invention, what is claimed is:—

The combination with a hat pin having an opening therein, of a protector embodying a pair of complemental sections, a pivot pin connecting said sections together intermediate their ends, the opposed faces of said sections diverging from their pivotal point at one side thereof, a chamber formed in the opposed faces of said sections at the opposite side of the pivotal point, a coiled spring surrounding the pivot pin and having its ends engaging the divergent faces of the sections to normally hold the side walls of the chamber in contact and a pin secured to one inner wall of the chamber and extending transversely of the latter for passage through the hat pin opening.

In testimony whereof I affix my signature.

AGNES MAY WINTERBOTTOM.

Copies of this patent may be obtained for five cents each, by addressing the "Commissioner of Patents, Washington, D. C."